(12) United States Patent
Batchelder et al.

(10) Patent No.: US 10,384,439 B2
(45) Date of Patent: Aug. 20, 2019

(54) CONTINUOUS LIQUID INTERFACE PRODUCTION SYSTEM WITH VISCOSITY PUMP

(71) Applicant: Stratasys, Inc., Eden Prairie, MN (US)

(72) Inventors: J. Samuel Batchelder, Somers, NY (US); Jonathan B. Hedlund, Blaine, MN (US); Paul E. Hopkins, Savage, MN (US); Steven A. Chillscyzn, Victoria, MN (US)

(73) Assignee: STRATASYS, INC., Eden Prairie, MN (US)

( * ) Notice: Subject to any disclaimer, the term of this patent is extended or adjusted under 35 U.S.C. 154(b) by 305 days.

(21) Appl. No.: 15/343,752

(22) Filed: Nov. 4, 2016

(65) Prior Publication Data

US 2017/0129169 A1    May 11, 2017

Related U.S. Application Data

(60) Provisional application No. 62/252,066, filed on Nov. 6, 2015.

(51) Int. Cl.
*B33Y 50/02* (2015.01)
*B33Y 30/00* (2015.01)
(Continued)

(52) U.S. Cl.
CPC ............ *B33Y 50/02* (2014.12); *B29C 64/124* (2017.08); *B29C 64/129* (2017.08);
(Continued)

(58) Field of Classification Search
CPC ............................ B29C 64/245; B29C 64/124
See application file for complete search history.

(56) References Cited

U.S. PATENT DOCUMENTS 3,573,457 A * 4/1971 Grant ...................... C03C 15/00
                                                              250/461.1
5,073,831 A * 12/1991 Flint ..................... G02B 7/1815
                                                              359/845
(Continued)

FOREIGN PATENT DOCUMENTS

WO     WO-2011086450 A2 *  7/2011  ........... B29C 64/135

*Primary Examiner* — Alison L Hindenlang
*Assistant Examiner* — George W. Brady
(74) *Attorney, Agent, or Firm* — Westman, Champlin & Koehler, P.A.

(57) ABSTRACT

A continuous liquid interface production system includes a source of optical stimulation. The system includes a vessel configured to retain a pool or film of optically sensitive monomer and a substantially optically transparent plate retained by the vessel. The optical stimulation is directed through the plate and into the pool or the film based upon a sliced 3D model of the part. The system includes source of reaction inhibitor wherein the substantially optically transparent plate allows the reaction inhibitor to permeate through the plate and into the pool or the film such that a sufficient amount of reaction inhibitor is within the pool or the film to create a zone proximate the plate that prevents polymerization therein. A build platen is configured to be at least partially immersed into the pool or the film and above the zone as a part is initially being built, wherein a build platen actuator moves the build platen away from the pool or the film in a direction substantially normal to a top surface of the plate. A relative movement actuator provides relative movement between the plate and the part in a direction substantially parallel to the top surface of the plate such that a viscosity pump effect is created that forces monomer between the part being built and the plate.

14 Claims, 13 Drawing Sheets

(51) Int. Cl.
    *B33Y 10/00*     (2015.01)
    *B29C 64/124*     (2017.01)
    *B29C 64/129*     (2017.01)
    *B29C 64/245*     (2017.01)
    *B29C 64/386*     (2017.01)

(52) U.S. Cl.
    CPC .......... *B29C 64/245* (2017.08); *B29C 64/386* (2017.08); *B33Y 10/00* (2014.12); *B33Y 30/00* (2014.12)

(56) References Cited

U.S. PATENT DOCUMENTS

| | | | |
|---|---|---|---|
| 5,491,376 A * | 2/1996 | Levine | H01J 29/085 313/461 |
| 5,506,607 A * | 4/1996 | Sanders, Jr. | B41J 2/01 118/695 |
| 7,435,495 B2 | 10/2008 | DeSimone et al. | |
| 8,158,728 B2 | 4/2012 | DeSimone et al. | |
| 8,263,129 B2 | 9/2012 | DeSimone et al. | |
| 8,268,446 B2 | 9/2012 | DeSimone et al. | |
| 8,663,539 B1 * | 3/2014 | Kolodziejska | B29C 64/129 264/401 |
| 9,849,631 B1 * | 12/2017 | Goss | B29C 64/241 |
| 2009/0309267 A1 * | 12/2009 | Boot | B29C 64/135 264/496 |
| 2015/0102532 A1 | 4/2015 | DeSimone et al. | |
| 2015/0108687 A1 * | 4/2015 | Snyder | B29C 64/386 264/308 |
| 2015/0110910 A1 * | 4/2015 | Hartmann | B29C 64/20 425/78 |
| 2015/0246414 A1 * | 9/2015 | Hess | B29C 64/386 219/76.14 |
| 2015/0331412 A1 * | 11/2015 | Adair | G05B 19/4145 700/126 |
| 2015/0375452 A1 * | 12/2015 | Huang | B29C 64/20 425/150 |
| 2016/0144569 A1 * | 5/2016 | Martin | B29C 67/20 425/150 |
| 2016/0279705 A1 * | 9/2016 | Mironets | B33Y 30/00 |
| 2017/0217100 A1 * | 8/2017 | Gardiner | B29C 67/0066 |

\* cited by examiner

CONTINUOUS LIQUID INTERFACE PRODUCTION SYSTEM WITH VISCOSITY PUMP

CROSS REFERENCE TO RELATED APPLICATION

This application claims the benefit of U.S. Provisional Application Ser. No. 62/252,066 entitled CONTINUOUS LIQUID INTERFACE PRODUCTION SYSTEM WITH VISCOSITY PUMP which was filed on Nov. 6, 2015, the contents of which are incorporated by reference in its entirety.

BACKGROUND

The present disclosure relates to additive manufacturing systems for printing or otherwise producing three-dimensional (3D) parts and support structures. In particular, the present disclosure relates to a continuous liquid interface production (CLIP) system that includes a viscosity pump which allows larger sized parts and/or denser parts to be built in a layer-by-layer manner.

Additive manufacturing systems are used to print or otherwise build 3D parts from digital representations of the 3D parts (e.g., AMF and STL format files) using one or more additive manufacturing techniques. Examples of commercially available additive manufacturing techniques include extrusion-based techniques, jetting, selective laser sintering, high speed sintering, powder/binder jetting, electron-beam melting, and stereolithographic processes. One such stereolithographic process is a continuous liquid interface production (CLIP) system. For each of these techniques, the digital representation of the 3D part is initially sliced into multiple horizontal layers. For each sliced layer, a tool path is then generated, which provides instructions for the particular additive manufacturing system to print the given layer.

In another example, in one stereolithography-based additive manufacturing system, a 3D part is printed from a digital representation of the 3D part in a layer-by-layer manner by projecting light across a vat of photo-curable resin. The projected light in various examples is provided via a projector, such as a DLP (Digital Light Processing) ultraviolet projection image, or is drawn, such as via a laser. For each layer, the projected light provides a light image representing the layer on the surface of the liquid resin, which cures and solidifies the drawn light pattern. After the layer is completed, the system's platform is lowered by a single layer increment. A fresh portion of the resin then recoats the previous layer, and the light is projected across the fresh resin to pattern the next layer, which joins the previous layer. This process is then repeated for each successive layer. Afterwards, the uncured resin may be cleaned, and the resulting 3D part may undergo subsequent curing.

SUMMARY

An aspect of the present disclosure includes a continuous liquid interface production system includes a source of an optical stimulant configured to form a planar programmably structured image related to a layer of a part. The system includes a vessel configured to retain a pool or film of light sensitive monomer where a substantially optically transparent plate is retained by the vessel wherein the optical stimulation is configured to be directed through the plate and into the pool or the film. The system includes a source of reaction inhibitor wherein the substantially optically transparent plate is configured to allow the reaction inhibitor to permeate through the plate and into the pool or the film such that when the system is in use, a sufficient amount of reaction inhibitor is in the pool or the film to create a zone proximate the plate that prevents polymerization therein. A build platen is configured to be at least partially immersed into the pool or the film and above the zone at least at a beginning of the build process of a three dimensional part. The system includes a build platen actuator that moves the build platen in a direction substantially normal to a top surface of the plate. A relative movement actuator is configured provides relative movement between the plate and the part being built in a direction substantially parallel to the top surface of the plate such that a viscosity pump effect is created that forces monomer between the part being built and the plate. The system includes a controller configured to cause the source to project the optical stimulation through the plate and into the pool or the film based upon a sliced 3D model of the part based upon sensed variables comprising at least a height of the build platen.

In one aspect, the relative movement is caused by rotational movement of the part relative to a stationary plate. In another aspect, the relative movement is caused by rotational movement of the plate relative to the part. In yet another aspect, the relative movement is caused by linear, oscillating movement of the plate relative to the part. In yet another aspect, the motion is a combination of linear and rotational translations.

In an aspect, the plate can have a substantially flat, planar top surface. In another aspect the flat, planar top surface is interrupted by a plurality of trenches or grooves. In the embodiment where the relative movement is rotational movement, the plurality of grooves or trenches can be configured as a plurality of spiral shaped grooves. In the embodiment where the relative movement is linear movement of the plate relative to the part, the plurality of grooves can be configured to be spaced apart linear grooves that are at an angle between five degrees and ninety degrees relative to the direction of linear movement.

In embodiments where a plurality of trenches or grooves interrupt the top surface of the plate, a bottom surface below each of the grooves can be treated to cause the plate to be opaque to the optical stimulation below the grooves through a surface treatment. In another embodiment, conduits can be located within the plate below the plurality of grooves or trenches to allow a cooling fluid to flow there-through.

Another aspect of the present disclosure relates to a method of printing a part using an additive manufacturing system. The method includes providing a continuous liquid interface production system comprising a substantially optically transparent plate retained in a vessel containing a pool or the film of monomer. The system includes a source is configured to direct an optical stimulation through the substantially optically transparent plate. The system includes a build platen configured to provide a bonding surface for an upper portion of the part being built, an actuator configured to raise the build platen in a direction substantially normal to a top surface of the plate and a controller configured to monitor a height of the build platen and to send a signal to cause the source to send the optical stimulation through the plate and into the pool or the film to cause a layer of the part to be polymerized. The method includes raising the build platen and the part being built in the direction substantially normal to the upper surface of the plate while causing successive optical stimulations to be sent through the plate and into the pool or the film to build a portion of the part. The method includes causing relative movement between the part and the plate in a direction substantially parallel to the top surface of the plate while raising the build platen such that a viscosity pump effect is created between the part and the plate. A series of optical stimulation is emitted by the source and into the pool or the film to form additional layers of the part until the part is built.

In one aspect, the relative movement of the method between the part and the plate is rotational movement of the part about an axis of rotation substantially parallel to a top surface of the plate while the part is raised substantially normal to the top surface of the plate. In another aspect, the relative movement between the part and the plate is rotational movement of the plate substantially parallel to a top surface of the plate while the part is raised in a direction substantially normal to the top surface of the plate with substantially no rotational movement. In another aspect, the relative movement between the part and the plate is linear movement of the plate relative to the part in a direction substantially parallel to a top surface of the plate while the part is raised in a direction substantially normal to the top surface of the plate with substantially no linear movement.

DEFINITIONS

Unless otherwise specified, the following terms as used herein have the meanings provided below:

The terms "preferred", "preferably", "example" and "exemplary" refer to embodiments of the invention that may afford certain benefits, under certain circumstances. However, other embodiments may also be preferred or exemplary, under the same or other circumstances. Furthermore, the recitation of one or more preferred or exemplary embodiments does not imply that other embodiments are not useful, and is not intended to exclude other embodiments from the scope of the present disclosure.

The terms "about" and "substantially" are used herein with respect to measurable values and ranges due to expected variations known to those skilled in the art (e.g., limitations and variabilities in measurements).

The term "vessel" as used herein is a receptacle that capable of retaining a monomer where the depth of the monomer that can range from a film layer or droplets to any depth required to utilize a continuous liquid interface production (CLIP) system.

DETAILED DESCRIPTION

The present disclosure relates to a continuous liquid interface production (CLIP) system that utilizes a viscosity pump effect to force monomer and initiator between a substantially optical transparent plate and a bottom surface of a 3D part being built. Using a viscosity pump effect in a CLIP process results in larger size 3D parts and larger substantially solid part to be printed relative to previous CLIP systems. The viscosity pump effect of the CLIP system of the present disclosure includes moving the optically transparent plate relative to a 3D part or moving the 3D part relative to the optically transparent plate in a direction substantially parallel to an upper surface of the plate such that the relative movement of the optically transparent plate and the 3D part forces light sensitive monomer and initiator between the plate and a previously printed layer of the 3D part. Forcing the monomer and initiator between the previous printed layer of the 3D part and the substantially optically transparent plate allows for larger and substantially solid parts to be printed in a shorter amount of time relative to previously disclosed CLIP systems.

Figure 1:
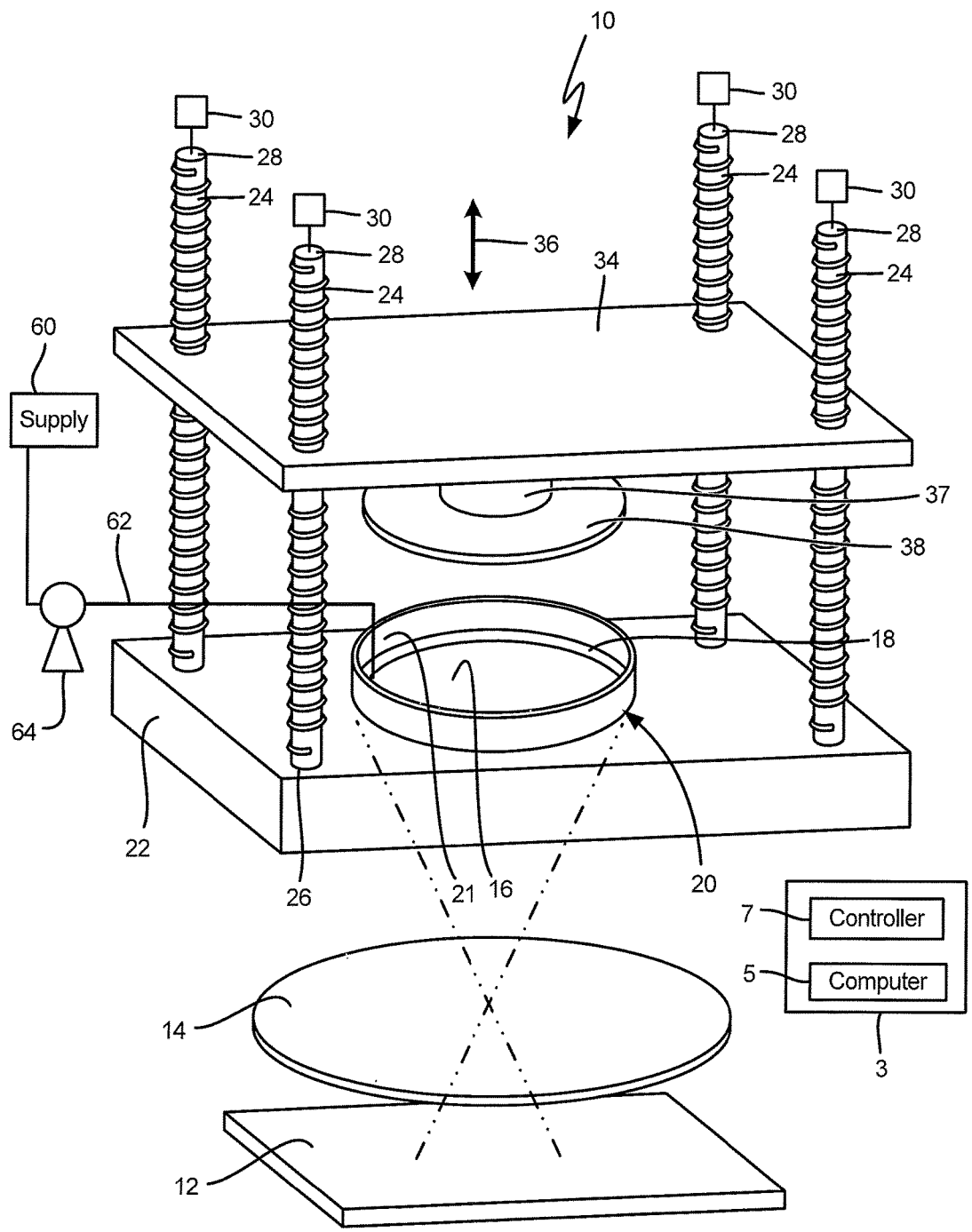
FIG. 1 is a perspective view of a typical continuous liquid interface production (CLIP) system.

Referring to FIG. 1, a typical CLIP system is illustrated at 10. The CLIP system 10 includes a digital light projector (DLP) 12 which projects an optical stimulation in a pattern based upon a geometry of a sliced layer of a 3D model to an imaging lens 14. An alternative to the imaging lens 14 is a mirror. The imaging lens 14 directs the projected optical stimulation through a substantially optically transparent plate 16 that typically is at least a portion of a bottom wall 18 of a vessel 20. The vessel 20 has an interior cavity 21 configured to retain a pool 23 of a monomer and an initiator that are reactive with the optical stimulation, where the vessel is retained on a support member. While a DLP is disclosed, any source of optical stimulation can be utilized where the source emits the optical stimulation in the form of a layer of a part that is being printed by the CLIP process.

The CLIP system 10 includes a support member 34 that extends a selected distance above the vessel 20. A proximal end 26 of each of a plurality of threaded rods 24 are rotatably attached to the support member 22 and a distal end 28 are engaged by a motor 30 which causes the rods 24 to rotate.

Threaded rods 24 threadably engage a threaded bore 32 in a plate 34 wherein when the motors 30 rotate the rods 24, the threaded engagement of the rods 24 and the bore 32 causes the plate 34 to move in direction of arrow 36. A direction of the rotation of the rods 24 will cause the plate 34 to raise and lower relative to the vessel 20.

Figure 2:
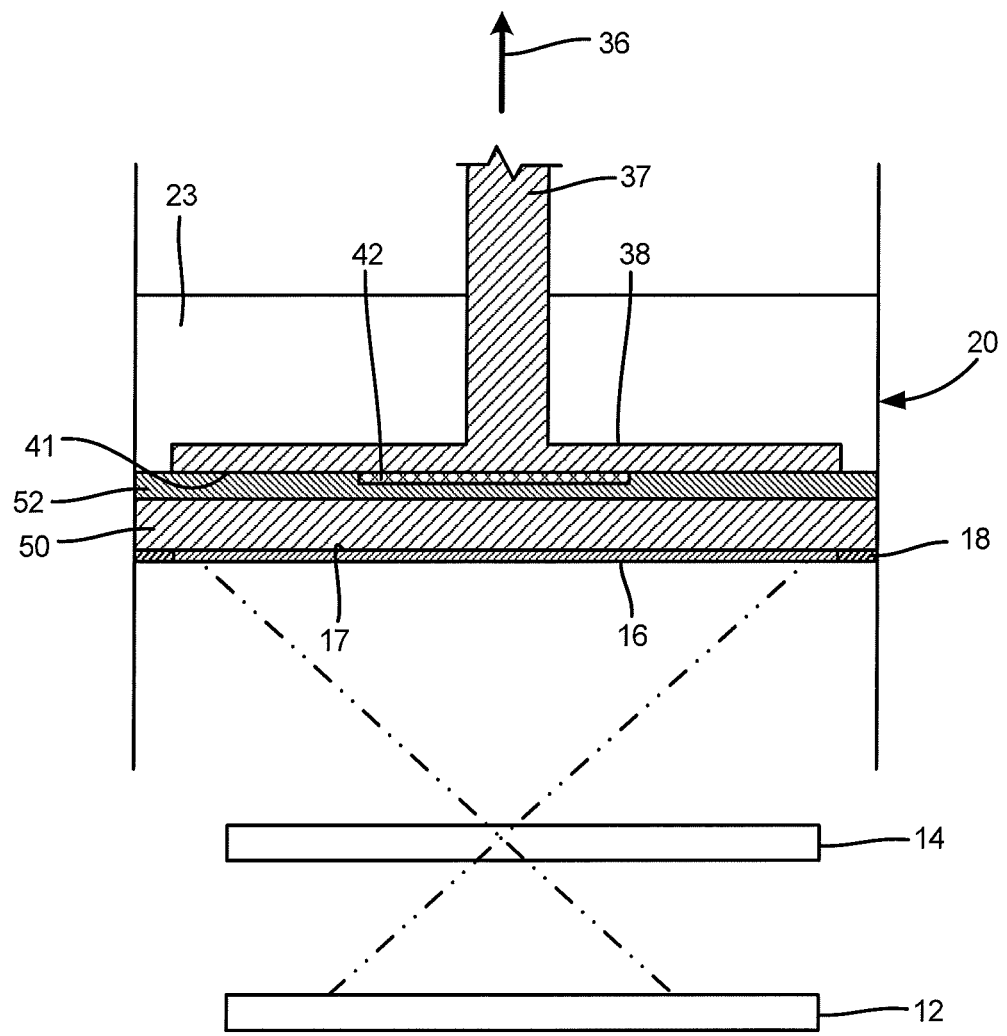
FIG. 2 is a schematic view of a pool of monomer within a vessel of a typical CLIP system.

Referring to FIGS. 1 and 2, a build platen 38 is attached to the plate 34 with a shaft 37 where the build platen 38 is configured to adhere to polymerized material during the initial building of the part using the CLIP process. At the beginning of the printing processes, at least a bottom surface 41 of the build platen 38 is submerged in a pool 23 of monomer and initiator. A top layer of a 3D part 42 is bonded to the build platen 38 through a polymerization process initiated by imaging the optical stimulation, typically UV light, through the substantially optically transparent plate 16 that causes the initiator and monomer to react and polymerize onto the bottom surface 41 of the build platen 38. The build platen 38 is raised typically at a substantially constant velocity. However, the build platen 38 can be raised at variable velocity or with pauses in a climb rate as well.

When the previously printed layer is raised a selected distance in direction substantially normal to a top surface of the plate 34 as indicated by an arrow 36, typically a height of a layer to be printed, another pattern of optical stimulation is projected into the pool 23 to form the next layer which is bonded to the previously formed layer. The 3D part is subsequently formed in a layer by layer manner by projecting patterns of optical stimulation from the DLP 12 that is directed by the imaging lens 14 through the optically transparent plate 16 and into the pool 23 of monomer and initiator in the vessel 20 as the rotating rods 24 raise the build platen 38 a distance of the next layer. The pattern of optical stimulation causes the polymerization reaction with the monomer and initiator that results in a successive layer of the 3D part being formed. The layer by layer processing is continued until the 3D part is formed. An alternative to bonding the top layer of the 3D part 42 to the build platen 38 is to bond a sacrificial layer(s) that separate the build platen 38 from a top edge of the 3D part 42 such that the removal of the sacrificial layer(s) from the build platen 38 will not damage the top layer(s) of the 3D part.

As the layers of the 3D part 42 are formed in the pool 23 of the monomer and the initiator, a reaction inhibitor is required proximate a top surface 17 of the substantially optically transparent plate 16 to prevent polymerization of the monomer onto the plate 16. In an exemplary CLIP system, the reaction inhibitor is a gas that is capable of permeating through the substantially optically transparent plate 16 to create a zone 50 where polymerization does not occur. The zone 50 is commonly referred to as a dead zone. A typical dead zone layer 50 thickness is in the range of about 20 microns to about 30 microns. However, a dead zone layer 50 of any thickness that allows for the printing of 3D parts using a CLIP process is within the scope of the present disclosure.

An exemplary reaction inhibitor is oxygen and an exemplary material of construction of the plate 16 is an amorphous fluoroplastic that is oxygen permeable. One exemplary amorphous fluoroplastic is sold under the trade name Telfon® AF by the E. I. du Pont de Nemours and Company located in Wilmington, Del. One particularly useful amorphous fluoroplastic is Telfon® AF 2400 manufactured by du Pont. Additional materials include perfluoropolyether polymers such as described in U.S. Pat. Nos. 8,268,446, 8,263,129, 8,158,728 and 7,435,495. However, the present application is not limited to an oxygen permeable optically transparent plate 16 or a monomer where oxygen is a reaction inhibitor.

The oxygen can be supplied through the substantially optically transparent plate 16 as a component of ambient air having an oxygen concentration of about 21 mole percent oxygen and 79 mole percent nitrogen. The supply of oxygen can be enriched up to and including 100 mol % oxygen. The oxygen supply can be supplied either under ambient conditions or with elevated pressures where conditions, such as pressure and concentration of the inhibitor, affect the rate at which the inhibitor passes through the substantially optically transparent plate 16 which in turn affects the thickness of the dead zone 50. A thicker dead zone 50, such as a thickness of several print layers in the pool 23, can result in absorption of some of the imaged light, which can result in a degradation of the quality of the part 42.

Where oxygen is used as the inhibitor, a typical permeability may be from 10 or 20 Barrers to up to 1,000 to 2,000 Barrers, or more. Also, the pressure at which the oxygen is supplied and permeability of oxygen through the substantially optically transparent plate 16 are directly proportional.

The concentration of the oxygen reaction inhibitor in the pool 23 is controlled such that a reactive layer 52 between the part 42 and the dead zone 50 can be polymerized to form the next layer of the 3D part 42 onto the previously formed layer of the 3D part 42 by causing a pattern of optical stimulation to pass through the substantially optically transparent plate 16. The reactive layer 52 is typically about 20 and about 30 microns in thickness. The process is repeated by emitting the desired pattern of optical stimulation in the reactive layer 52 as the 3D part 42 is raised by the rods 24 until the 3D part 42 is formed.

As the pool 23 of the monomer and the initiator is depleted as successive layers of the 3D part 32 are formed, the CLIP system 10 includes a supply 60 of monomer and initiator to the vessel 20 through a conduit 62 where the supply 60 of monomer and initiator is may be controlled to maintain a desired level of monomer and initiator in the vessel 20. The supply 60 can be elevated relative to the vessel 20 such that head pressure can be utilized as the driving force to supply the monomer and initiator to the vessel 22. Alternatively, a pump 64 can be utilized to supply the necessary pressure to cause the monomer and initiator into the vessel 20.

The system 10 also includes a controller assembly 3, which may include one or more control circuits (e.g., a controller 7) and/or one or more host computers (e.g., a computer 5) configured to monitor and operate the components of the system 10. For example, one or more of the control functions performed by the controller assembly 3, such as performing move compiler functions and emitting light or optical stimulation, can be implemented in hardware, software, firmware, and the like, or a combination thereof; and may include computer-based hardware, such as data storage devices, processors, memory modules, and the like, which may be external and/or internal to the system 10.

The controller assembly 3 may communicate over a communication line with the DLP 12, the motors 30, and various actuators, sensors, calibration devices, display devices, and/or user input devices that are described with respect to the system 10 or other systems disclosed herein. The controller assembly 3 can communicate with the various devices using electrical, optical, and/or wireless signal lines, which may be external and/or internal to system 10, allowing controller assembly 3 to communicate with various components of system 10 or other systems 100, 200, 300, 400 and 500 described herein.

While the CLIP system described above is known and described in, for example, U.S. Printed Application Publication 2015/0102532, the prior CLIP systems and processes are limited in size and to low cross sectional solid areas of the 3D parts 42. As such, a typical part printed using a prior CLIP system 10 had a lattice style that had numerous voids.

Figure 3:
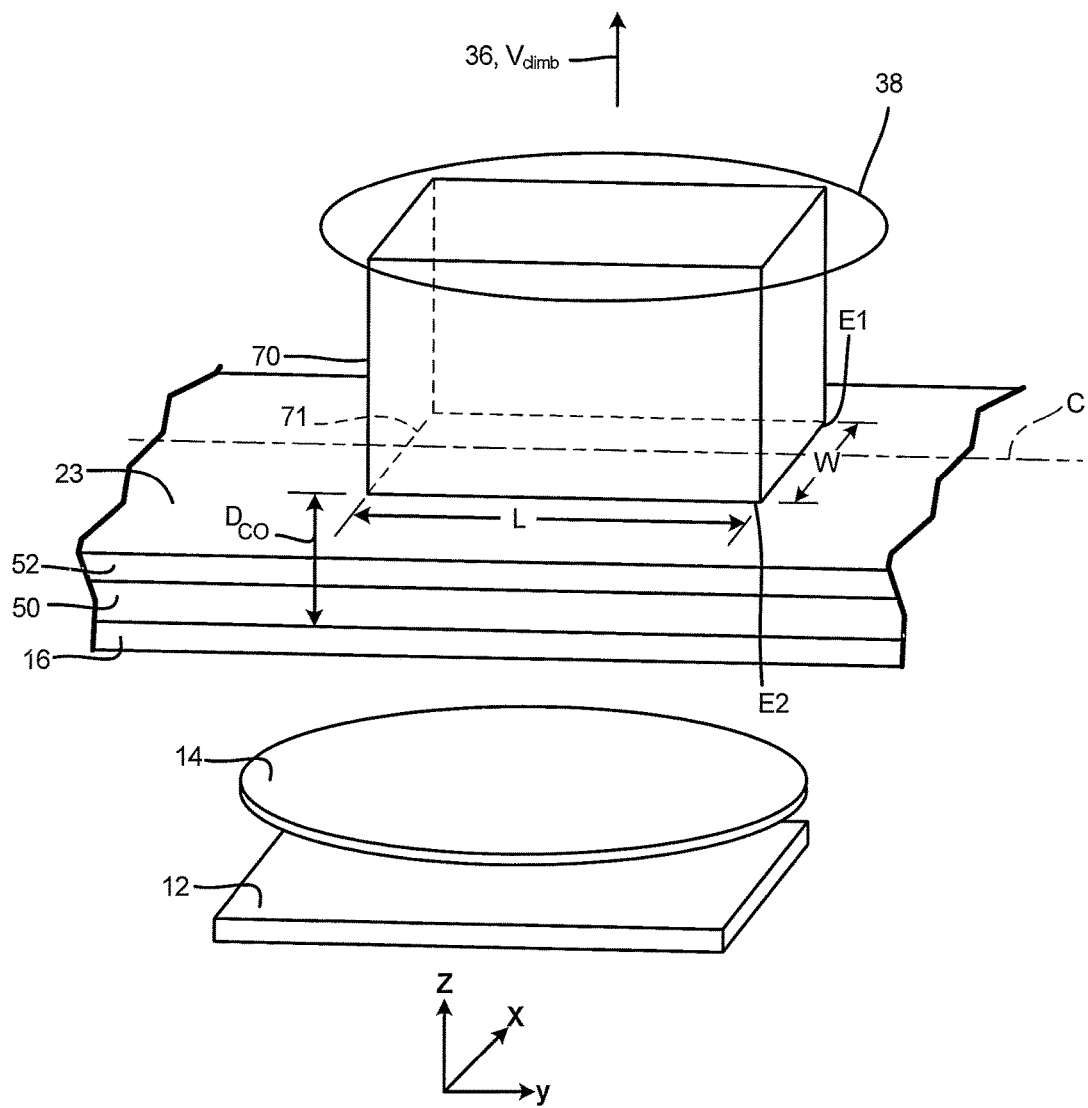
FIG. 3 is a schematic view of a typical CLIP system building a substantially cuboid part.

In the prior CLIP systems 10, a part size limitation imposed by the dead zone 50 can be calculated. For example, referring to FIG. 3, a rectangular block 70 is fabricated using the prior CLIP system 10 where the part has a width W in the x direction, a length L in the y direction where W is significantly less than L, and with an arbitrary size in the z direction. The rectangular block 70 is fabricated with the prior CLIP system 10 by lifting the rectangular block 70 at a constant velocity $V_{climb}$ in the z direction which requires the monomer and the initiator to flow between a bottom surface 71 of the rectangular block 70 and the substantially optically transparent plate 16 in a gap therebetween $D_{co}$. For a monomer and initiator composition having a viscosity η, the rate of change of pressure along the rectangular channel $D_{co}$ in direction of L is a function of flow Q is defined by Equation 1.

$$Q = \frac{LD_{co}^3}{12\eta} \frac{\partial P}{\partial x} \quad \text{(Equation 1)}$$

Since the flow under the rectangular block 70 is being incorporated into the rectangular block 70, the flow rate increases linearly from a center C of the rectangular block 70 to the edges E1 and E2 at a rate of ±W/2. The resulting flow rate is defined by the following equation:

$$Q(x) = V_{climb} L \frac{2x}{W} \quad \text{(Equation 2)}$$

For a given pressure, typically atmospheric pressure on the surface of the vessel 20 and viscosity η of the monomer and the dead zone 50 thickness, a maximum part width can be calculated by combining Equations 1 and 2 and integrating such that the maximum part width can be calculated by the following equation:

$$Q(x) = \sqrt{\frac{PD_{co}^3}{3V_{climb}\eta}} \quad \text{(Equation 3)}$$

By way of example, the limitation on part size because of the limitations of flow in the rectangular channel $D_{co}$, at a published, typical climb rate of 300 mm/hr in the z direction, the maximum part width W at atmospheric pressure is 0.42 inches. To print a twenty-four inch wide part with the same pixel resolution, the climb rate must be reduced to 0.1 mm/hr, or a factor of reduction in climb rate of 3,000 from published, typical climb rates.

Increasing the ambient pressure above the monomer will increase the width W of the 3D parts that can be printed. However, the increase in ambient pressure results in a relatively small increase in flow into the channel $D_{co}$.

Increasing the ambient pressure results in the transport of oxygen through the TEFLON® AF plate 16 into the monomer pool 23. Therefore, a higher ambient pressure results in an increased thickness of the dead zone 34. The comparable part size increases as the square root of pressure and the thickness of the dead zone 34 to the 3/2 power. Therefore, operating the CLIP system 10 at about ten atmospheres increases the part width W availability by about five times a width W relative to when the CLIP system is operated at about one atmosphere. Therefore, while useful, increasing ambient pressure provides limited increase in the size of the part being fabricated using the CLIP process.

Figure 4:
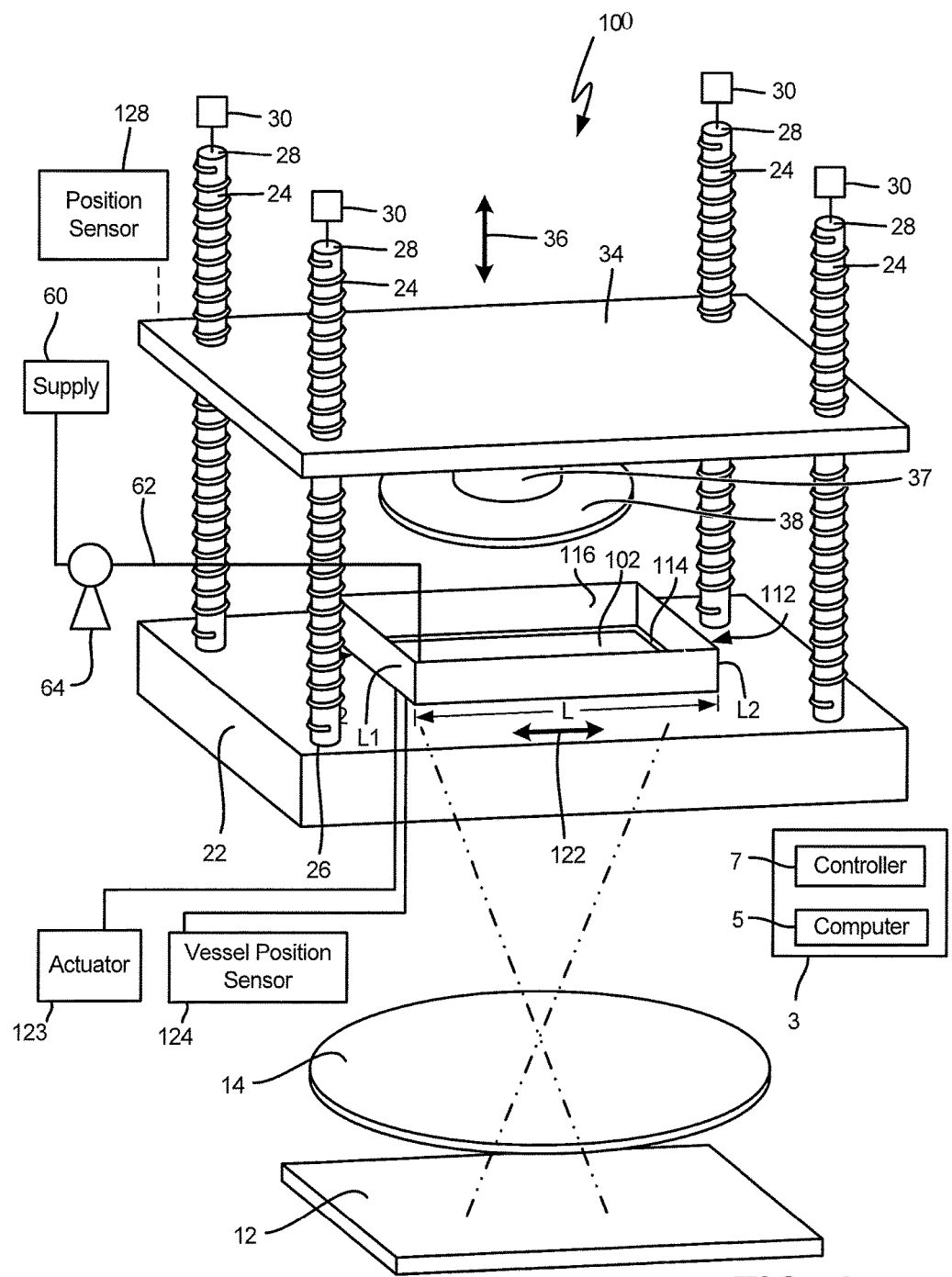
FIG. 4 is a perspective view of a CLIP system having a linear viscosity pump effect.
Figure 5:
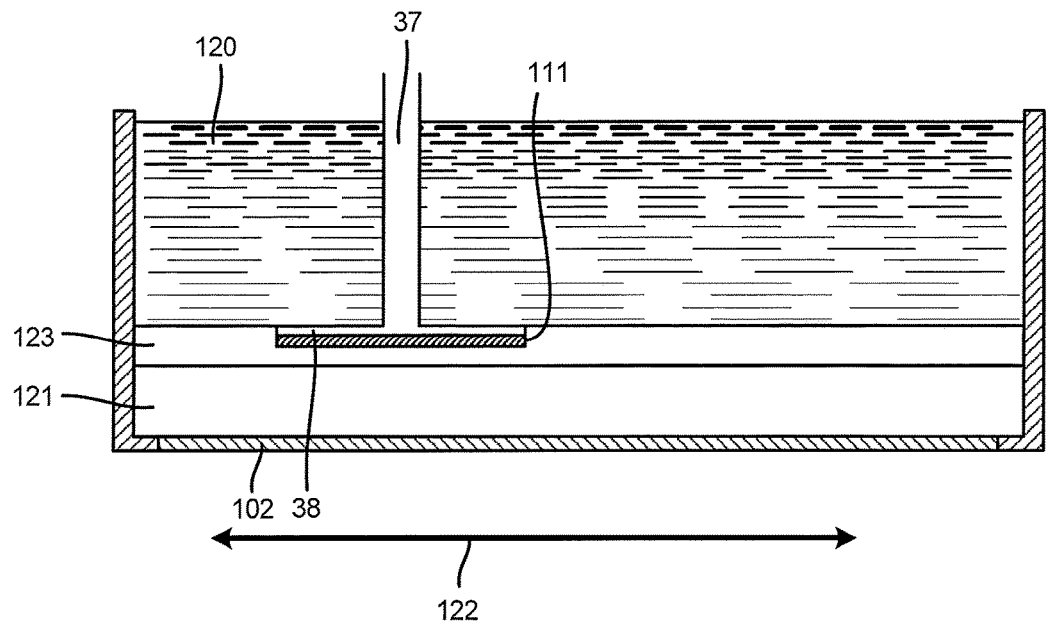
FIG. 5 is a schematic view of a portion of the CLIP system wherein the vessel is in a first linear position relative to the part.
Figure 6:
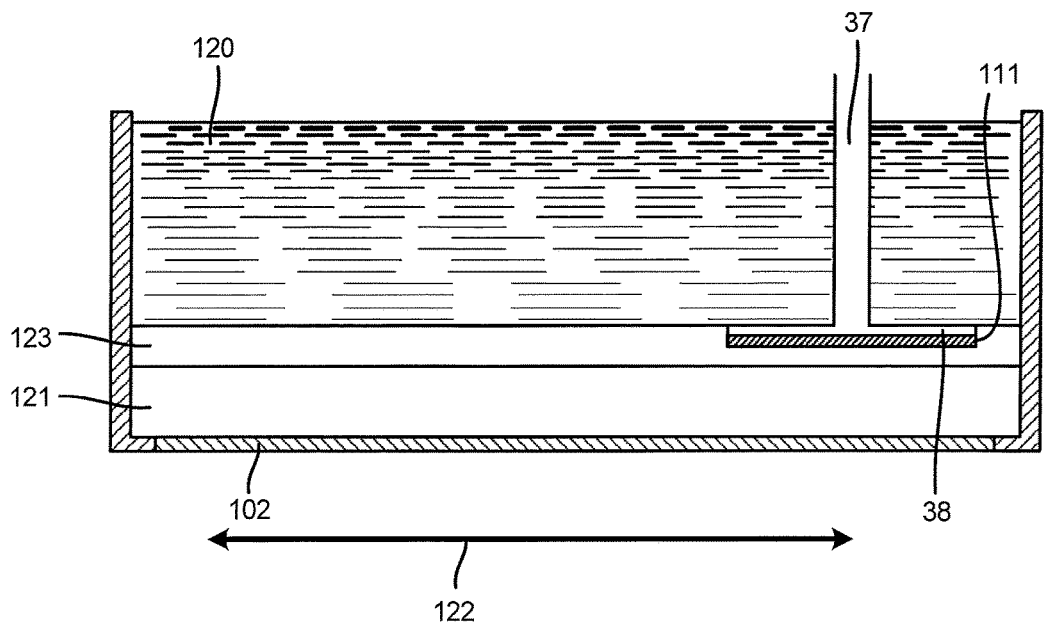
FIG. 6 is a schematic view of a portion of the CLIP system wherein the vessel is in a second linear position relative to the part.

Referring to FIGS. 4-6, a CLIP system 100 is illustrated that utilizes a digital light projector 12, an imaging lens 14, a support plate 22, the plurality of threaded rods 24 that move the plate 34 with motors 30, and a build platen 38 connected to the support plate 22 with the shaft 37 and similar chemical processes to that described with respect to the CLIP system 10. However, other actuating mechanisms besides threaded rods 24 are also within the scope of the present disclosure. While a DLP 12 is described herein, the present disclosure is not limited to a DLP. Rather any source of an optical stimulator can be utilized in the present disclosure.

The CLIP system 100 includes a substantially optically transparent plate 102 that can move relative to a 3D part 111 that is being built in a direction substantially parallel to an upper surface of the optically transparent plate 102. The substantially optically transparent plate 102 remains in a stationary position until a sufficient amount of the 3D part 111 being printed can withstand the shear forces caused by moving the optically transparent plate 102 relative to the part 111 in the direction substantially parallel to an upper surface of the substantially optically transparent plate 102.

The substantially optically transparent plate 102 is retained in a bottom surface 114 of a vessel 112 where a seal is formed between the plate 102 and the bottom surface 114 of the vessel 112. A continuous side wall 116 extends from the bottom surface 114, where the bottom surface 114 and the continuous side wall 116 form a volume that retains a pool 120 of a photo sensitive monomer and initiator.

The vessel 112 with the substantially optically transparent plate 102 moves in a linear direction in a reciprocating manner relative to the 3D part being built as indicated by arrows 122. The plate 102 is moved by one or more vessel actuator(s) 123 through a length of travel L at a substantially constant velocity from a first end L1 to a second end L2. The vessel actuator 123 can include, but is not limited to an electric or pneumatic linear actuator, a pneumatic or hydraulic cylinder(s) or a rack and pinion actuator where the rack is attached to the vessel and the pinion is attached to a prime mover, such as an electric motor. Whatever vessel actuator 123 is utilized, the vessel actuator 123 engages and moves the vessel 112 such that the vessel actuator 123 does not interfere with the projection of the optical stimulation through the substantially optically transparent plate 102.

The substantially optically transparent plate 102 moves under the 3D part 111 being printed along the length of travel L from the first end L1 to the second end L2 at a substantially constant velocity $V_{plate}$. Once the plate 102 reaches the second end L2, the linear direction is reversed and moves at the substantially constant velocity $V_{plate}$ in a direction of the arrows 122. The oscillating movement of the plate 102 is continued through the build process.

The movement of the substantially optically transparent plate 102 under the part 111 being built causes a viscosity pump effect that forces monomer and initiator of the pool 120 between the moving plate 102 and the part 111 being built. Forcing monomer and initiator between the bottom surface of the part 111 and the moving plate 102 allows for that larger and higher cross-sectional solid area parts 111 to be built using the CLIP process 100 relative to the CLIP system 10 that does not utilize a viscosity pump effect.

A position sensor 124 senses a position of the vessel 112 in the length of travel L between the first end L1 and the second end L2. The position sensor 124 sends a signal to a controller 7 that derives the velocity $V_{plate}$ of the plate 102 utilizing computer 5 by determining the change in position over time. The controller 7 then sends a signal to the actuator 123 which can adjust the velocity $V_{plate}$ of the plate 102 and/or to change linear direction of the plate 102 when the plate 102 reaches the first end L1 or the second end L2 of the length of travel L.

While the vessel 112 and the plate 102 are moved in the linear direction L as indicated by the arrows 122, the threaded rods 24 and motors 30 raises the build platen 38 in a direction substantially normal to a top surface of the plate 102. The part 111 being built is raised a substantially constant velocity $V_{climb}$ which is determined utilizing a position sensor 128 that measures a position of the support plate 34 or the build platen 38 and sends a signal to the controller 7. The controller 7 determines the change in position of the support plate 34 or the build platen 38 over time to determine the velocity $V_{climb}$ at which the 3D part 111 is being raised. The controller 7 then sends a signal to the motors 30 to adjust the change in position over time to correct a deviation from a predetermined velocity $V_{climb}$.

Referring to FIGS. 5 and 6 when the actuator 108 raises the build platen 38 and the part 111 one layer, the controller 7 sends a signal to the digital light processor 12 which causes a pattern of optical stimulation, based upon a sliced 3D model of the 3D part 111, to be emitted and pass through the imaging lens 14, the plate 102, a dead zone layer 121 in the pool 120 and into a reactive layer 123. The resulting polymerization of the monomer and initiator in the reactive layer 123 cause the next layer of the 3D part 111 to be formed onto the previously printed layer of the 3D part 111.

The process is continued utilizing the viscosity pump effect which is the result of movement of the plate 102 relative to the part 111 in a direction substantially parallel to the top surface of the plate 102, and causes the monomer and initiator proximate the plate 102 to move substantially parallel to the movement of the plate 102 and therefore into a gap between the plate 102 and the bottom surface of the part 111. While the monomer and initiator are moving due to the viscosity pump effect between the bottom surface of the part 111 and the moving plate 102, the polymerization reaction occurs in a sufficiently short amount of time in the reactive layer 123 that the layer of the part 111 accurately registers on the previously printed layer of the part 111. The process is continued in a layer by layer manner until the part 111 is printed or built using the CLIP process and system 100.

In the CLIP system 100, the optically transparent plate 102 can have a surface area at least about two times the surface area of a maximum area of the part 111 to ensure that viscosity pump effect of the moving plate 102 results in a complete layer of monomer and initiator being forced between the previously printed layer of the 3D part 111 and the plate 102 in a single motion. As the layer of monomer and initiator are pumped between the plate 102 and the bottom surface of the part 111 in a single motion, the pattern of optical stimulation from the DLP 12 results in polymerization of the next layer in proper registry with the previously printed layer while minimizing distortions or printing errors. Such distortions or errors may be caused by reversing the direction of the plate 102 as the pattern of optical stimulation from the DLP 12 is emitted, which may result in flow anomalies and therefore errors in the printing of the layer.

As disclosed in FIGS. 5 and 6, the substantially optically transparent plate 102 is substantially rectangular in configuration. However, other configurations of the substantially optically transparent plate 102 are also contemplated.

Figure 7:
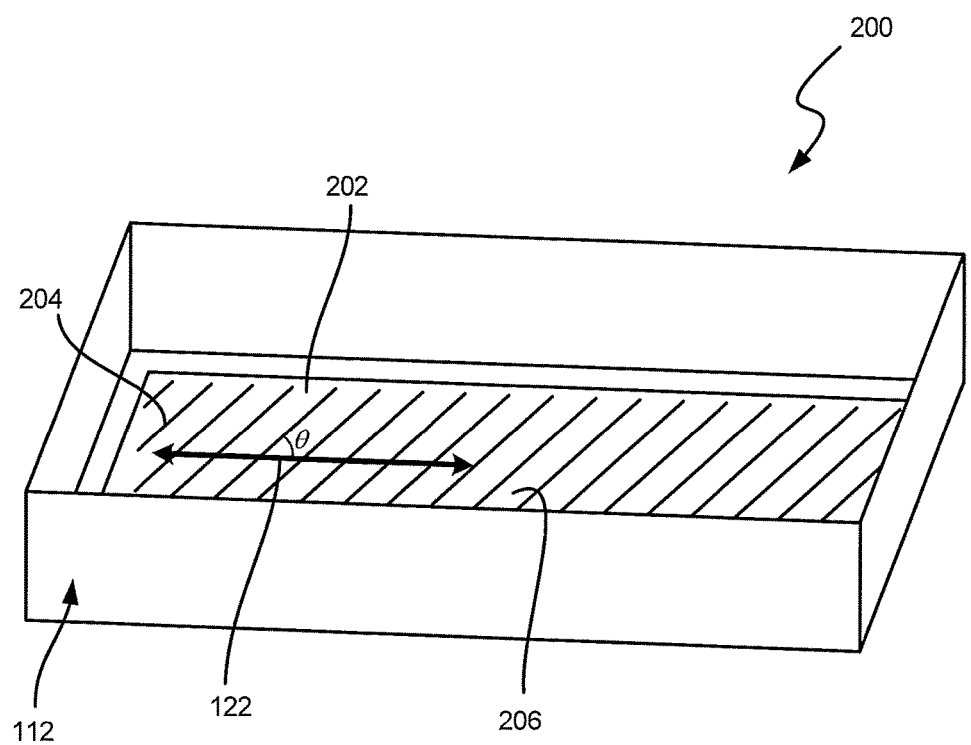
FIG. 7 is perspective view of a CLIP system wherein an optically transparent plate includes a plurality of spaced apart linear grooves or trenches.
Figure 8:
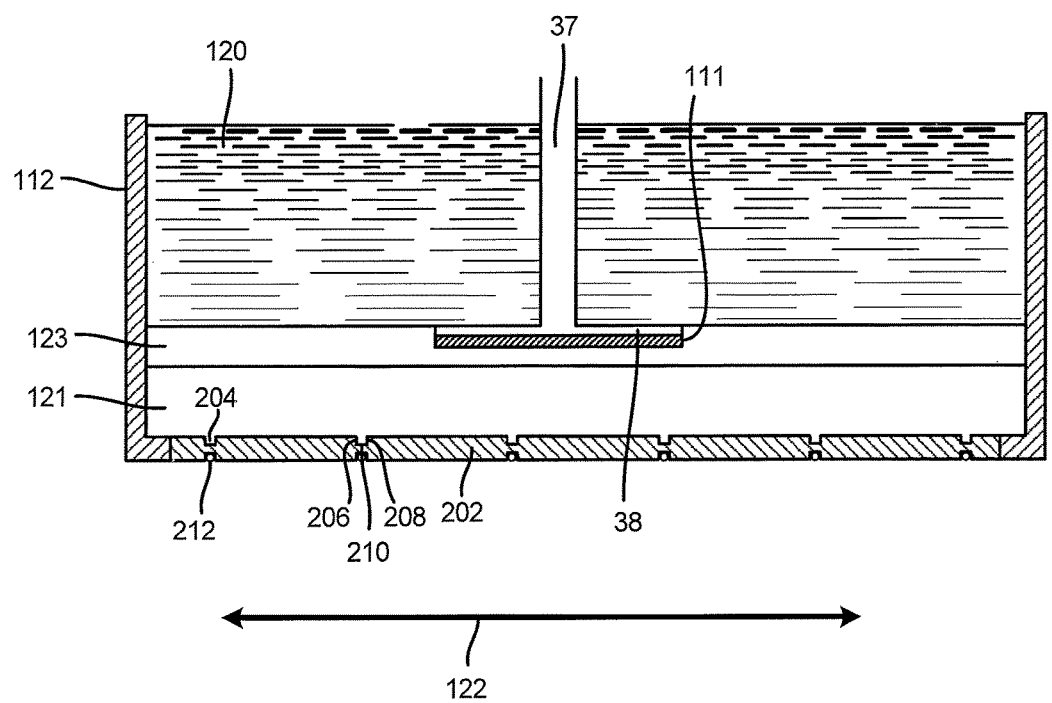
FIG. 8 is a cross-sectional view of an optically transparent plate with conduits below the linear spaced apart linear grooves or trenches.

Referring to FIGS. 7 and 8, a portion of a CLIP system 200 is illustrated similar to that of the clip system 100. Similar components of the system 200 will be given the same reference characters as that of the components of the system 100.

The system 200 differs from that of the system 100 in that a substantially optically transparent plate 202 retained by the vessel 112 includes a plurality of spaced apart and substantially parallel grooves or trenches 204 within a top surface of the plate 202. The grooves or trenches 204 are at an angle θ from the linear motion of travel of the plate 202 indicated by arrows 122, such that the grooves or trenches 204 interrupt an upper surface 206 of the plate 202 to enhance the viscosity pump effect to force the monomer and initiator between the upper surface 206 of the plate 202 and the bottom surface of the part 111.

While an angle θ of about 45° relative to the direction of travel is illustrated, any angle of the grooves or trenches 204 between about 5° and about 90° relative to the direction of travel is within the scope of the present disclosure. Grooves or trenches 204 that substantially align with the direction of travel of the plate 202 may not enhance the viscosity pump effect caused by the movement of the plate 202 relative to the bottom layer of the 3D part 111 within the pool 120 of monomer and initiator.

The grooves or trenches 204 have a depth that is at least a thickness of the dead zone layer 121. The grooves or trenches 204 in the plate 202 can have a thickness including up to about two to three thicknesses of the dead zone layer 121. If the thickness of the plate 202 becomes too great, the plate 202 may interfere with the transmission of the pattern of optical stimulation from the DLP 12 to the reactive layer 123 and can result in the degradation of part quality.

As illustrated, the grooves or trenches 204 have substantially vertical side walls 206 and 208 that are connected with a substantially horizontal bottom wall 210. A typical range of a width of the trenches is in the range of between about 10 micron and about 100 micron and more typically between about 15 micron and about 50 micron in width. However, other configurations of the grooves or trenches 204 are also contemplated including larger and smaller widths that provide a sufficient viscosity pump effect while producing a part 111 with sufficient quality and grooves or trenches 204 with different cross-sectional geometries.

As the grooves or trenches 204 are filled with monomer and initiator, a sufficient amount of reaction inhibitor, such as oxygen, is required to prevent the polymerization reaction from occurring the grooves or trenches 204 and thereby prevents the grooves or trenches 204 from being filled with polymerized material. As the grooves or trenches 204 are formed within the plate 202, which is permeable to the reaction inhibitor such as oxygen, the reaction inhibitor permeates into each groove or trench 204 through the side walls 206 and 208 and the bottom wall 210. The transfer of the reaction inhibitor through the side walls 206 and 208 and the bottom wall 210 transfers the reaction inhibitor into the grooves or trenches 204 in three dimensions and prevents the monomer from polymerizing within the grooves or trenches 204 as well as the dead zone 121.

In one embodiment, the region below the plurality of grooves or trenches 204 is treated to be opaque to the transmission of the pattern of optical stimulation from the DLP 12. As such, when the pattern of optical stimulation from the DLP 12 is projected through the plate 202, the optical stimulation is prevented from transmitting through the grooves or trenches 204. The optical stimulation is blocked below the grooves or trenches 204 to prevent an uneven transmission of optical stimulation to the bottom surface of the part 111 being built. Further, because the area of the grooves or trenches 204 are small relative to the area of the plate 202, there is substantially no effect on the quality of the part 111 being built.

For instance, with a climb rate ($V_{climb}$) of 360 mm/hr (100 micron/sec) and the plate 202 moving at a rate of 25 mm/sec, a 24 micron trench would pass across the region of the part 111 in a millisecond. The passage of a sparse number of trenches 204 across the part 111 as the pattern of optical stimulation is emitted by the DLP 12 does not substantially affect the build characteristics of the part 111.

Referring to FIG. 8, with the area of the plate 202 below the plurality of grooves or trenches being opaque, the plate 202 can optionally contain conduits 212 below the one or more of the grooves or trenches 204. A coolant, such as a liquid and/or a gas, can flow through the conduits 212 to remove heat from the plate 202, the pool 120 and the part 111 being formed.

The polymerization reaction of the monomer in the pool 120 is exothermic. As the frequency of the pattern of optical stimulation is emitted from the DLP and the amount of monomer per layer that is polymerized is increased due to the viscosity pump effect, the exothermic reaction can result in the heating of the pool 120 and the part 111. If the part 111 is heated to an elevated temperature, the part 111 can become thermally unstable and deform as it is being printed. Therefore, the removal of heat from the part 111 and the pool 120 can become a limiting factor in the speed at which the part 111 is printed.

Utilizing a coolant within the conduits 212 in the plate 202 allows for the removal of heat from the pool 120 and the part 111 while not adversely affecting the part quality, because of the relatively small area that is opaque to the pattern of optical stimulation relative to the part being printed. Therefore, the present disclosure provides the benefit of producing larger parts with increased cross-sectional density while increasing the rate at which the part 111 can be printed.

Figure 9:
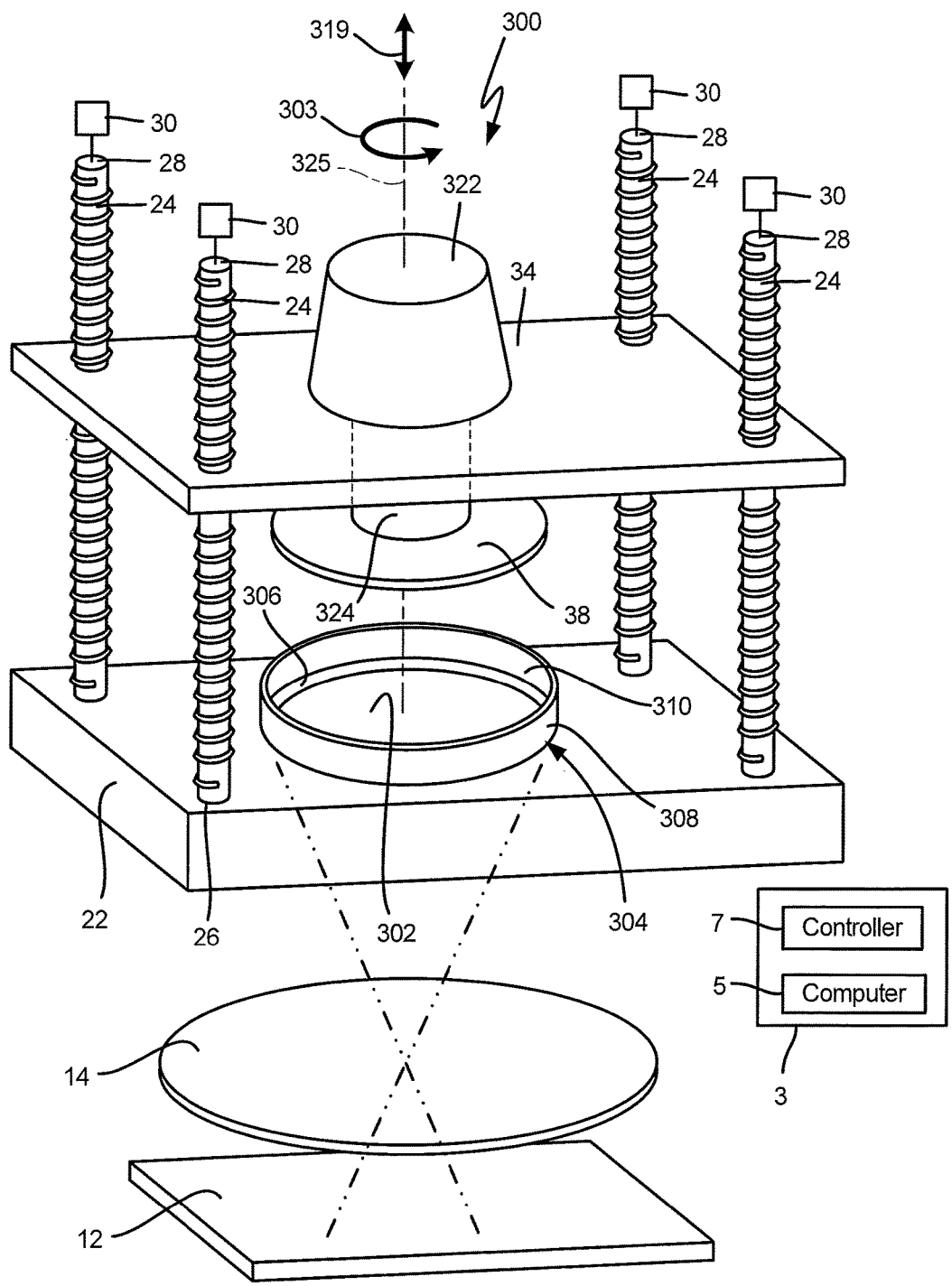
FIG. 9 is a perspective view of a CLIP system having a motor configured to rotate a build platen and part relative to an optically transparent plate to cause a rotational viscosity pump effect.
Figure 10:
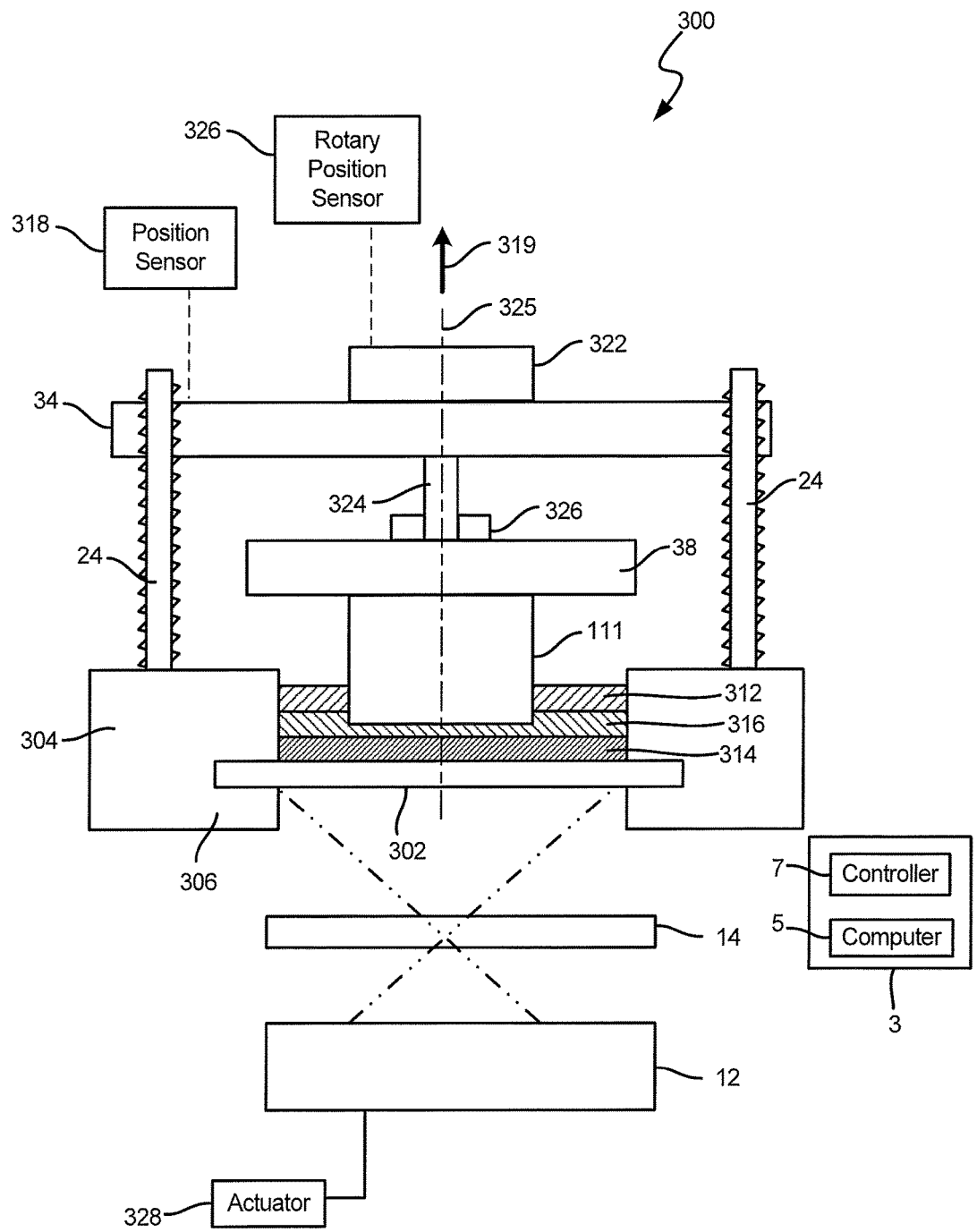
FIG. 10 is schematic view of the CLIP system of FIG. 9.

Referring to FIGS. 9 and 10, another CLIP system 300 is illustrated. The CLIP system 300 includes similar components as the components in the systems 100 and 200 and like components will be given the same reference characters.

The CLIP system 300 includes the digital light projector 12, imaging lens 14, a support plate 22, the plurality of threaded rods 24 that move the plate 34 with the motors 30 and a build platen 38 similar to the corresponding components in the CLIP system 10, 100 and 200. While a DLP 12 is described herein, the present disclosure is not limited to a DLP. Rather any source of an optical stimulation can be utilized in the present disclosure.

The CLIP system 300 includes a substantially optically transparent plate 302 through which a series of patterns of optical stimulation is transmitted to build a 3D part 111. In the embodiment 300, the plate 302 has a substantially circular configuration and is sealingly retained to a bottom wall 306 of a vessel 304. The vessel 304 has a continuous, substantially circular side wall 308 that extends from bottom wall 306. The vessel 304 defines a volume 310 that retains a pool of monomer and initiator. While a substantially circular plate 302 and a substantially cylindrical vessel 304 are disclosed, other configurations of the plate 302 and the vessel 304 are within the scope of the present disclosure.

Referring to FIGS. 9 and 10, as described previously, the build platen 38 is initially submerged into the pool 312 of monomer and initiator and is positioned proximate a top edge of the reactive layer 316 which is above the dead zone 314 caused by the reaction inhibitor that permeates through the plate 302. The digital light projector 12 then projects an optical stimulation based upon a sliced three dimensional model of the part. The pattern of optical stimulation is directed by the imaging lens 14 through the plate 302, the dead zone 314 and into the reactive layer 316 where the polymerization reaction occurs resulting in a first layer of the part 111 being formed onto the build platen 110.

The build platen 110 is raised at a selected substantially constant velocity $V_{climb}$ in direction substantially normal to a top surface of the plate 302 as indicated by arrow 319 where the position of the build platen 110 is sensed by a linear position sensor 318 and a signal is sent to a controller 7, as previously described. Once the build platen 38 has been raised a distance of the next layer, the DLP 12 projects the pattern of optical stimulation related to the configuration of the next layer of the 3D part 111 and the process is repeated until the part 111 is of a sufficient size and stability to rotationally move relative to the plate 302 in direction of arrow 303. Movement of the part 111 relative to the plate 302 in a direction substantially parallel to the top surface of the plate 302 causes a viscosity pump effect between the bottom surface of the part 111 and plate 302.

In the embodiment 300, an electric motor 322 is fixedly attached to the support plate 34 where at least an output shaft 324 of the electric motor 322 extends through an aperture in the support plate 34. The output shaft 324 can be directly coupled to the build platen 38 where the output shaft 324 is aligned with an axis of rotation 325 of the build platen 38 and the part 111 such that an eccentric rotational movement of the build platen 110 and the part 111 is prevented. Alternatively, a coupler 326 can attach the output shaft 324 to the build platen 38.

A rotary position sensor 326 senses a rotary position of the build platen 38 or output shaft 324, which in turn can be correlated to an angular position of the part 111. The rotary position sensor 326 sends a signal to the controller 7 which in turn sends a signal to the digital light projector 12 to cause a pattern of optical stimulation to be emitted based upon the sliced 3D model and the angular position of the part 111. The angular position of the part 111 is needed to properly orient the pattern of optical stimulation from the projector 12 onto the part 111 to register the layer being printed to the previously printed layer, unless the part is axially symmetric.

An alternative to sensing the angular position of the build platen 38 is to cause the projector 12 to rotate at the same rotational rate as that of the build platen 38 such that the pattern of optical stimulation will be properly aligned with the rotating part 111 such that the next layer is properly registered on the part 111. A motor or actuator 328 is coupled to the projector 12 where the motor or actuator 328 is controlled by the controller 7 to cause the projector 12 to rotate at the same rotational speed as that of the part 111.

Prior to rotating the part 111, a sufficient amount of the part 111 is printed to withstand the forces caused by rotation within the pool 312. The part 111 is then built while being rotated within the pool 312 of monomer and initiator with the viscosity pump effect using the CLIP process as previously discussed. The viscosity pump effect caused by the angular motion of the part 111 relative to the plate 302 allows larger and more dense parts 111 to be built relative to prior CLIP system 10 that does not utilize a viscosity pump.

Figure 11:
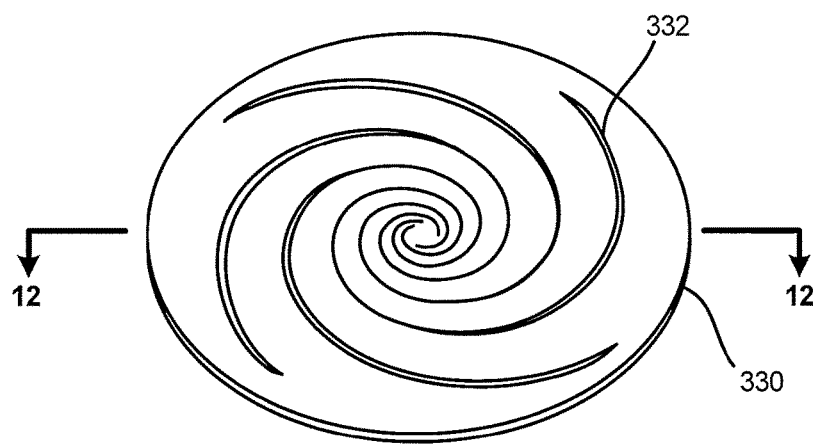
FIG. 11 is a perspective view of a plate having a plurality of trenches or grooves configured to enhance the rotational viscosity pump effect of the CLIP system of FIG. 9.
Figure 12:
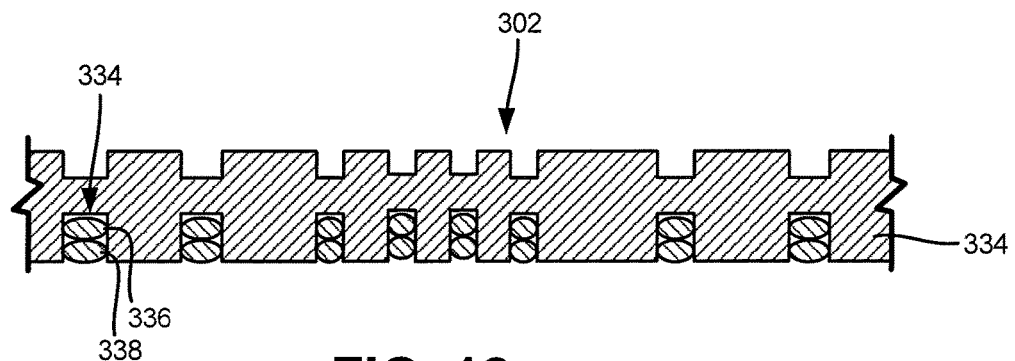
FIG. 12 is a sectional view of the plate of FIG. 11 where the plate includes conduits configured to transport a cooling fluid.

Referring to FIG. 11, an alternative configuration of a plate 330 is illustrated. The plate 330 is similar in configuration and dimensions to that of the plate 302. The plate 330 includes a plurality of grooves 332, each in the form a spiral. The spiral grooves 332 increase the viscosity pump effect by interrupting a top surface of the plate 302 as the part 111 moves relative to the plate 302. The grooves 332 are similar in cross sectional configuration to that of grooves 204 where the grooves 332 do not allow polymerization of the monomer due to the transfer of reaction inhibitor from the bottom wall and side walls of the grooves 332.

Further, a surface area below the grooves 332 can be coated to be opaque to the transmission of optical stimulation from the DLP 12 such that the optical stimulation is transmitted through the plate 302 at a substantially consistent power. Similar to the embodiment 200, the area of the grooves 332 is sufficiently small relative to the area of the plate 302 such that the quality of the part 111 being printed is not adversely affected by the un-polymerized areas within the projected optical stimulation.

Because the surface area below the grooves 332 is opaque, conduits for transporting cooling fluid can be retained within the plate 302 to remove heat caused by the polymerization reaction as previously described. It is contemplated that the plate 302 contain U shaped conduits 334 where a top portion 336 of each conduit 334 is above a bottom portion 338 of the conduit wherein an inlet end and an outlet end are located proximate a perimeter 344 of the plate 302 such that the conduits 334 do not substantially interfere with the projection of the pattern of optical stimulation from the DLP 12 through the plate 302 and into the pool 312 of monomer and initiator. The conduits 334 are configured to transport a cooling fluid as previously described.

Figure 13:
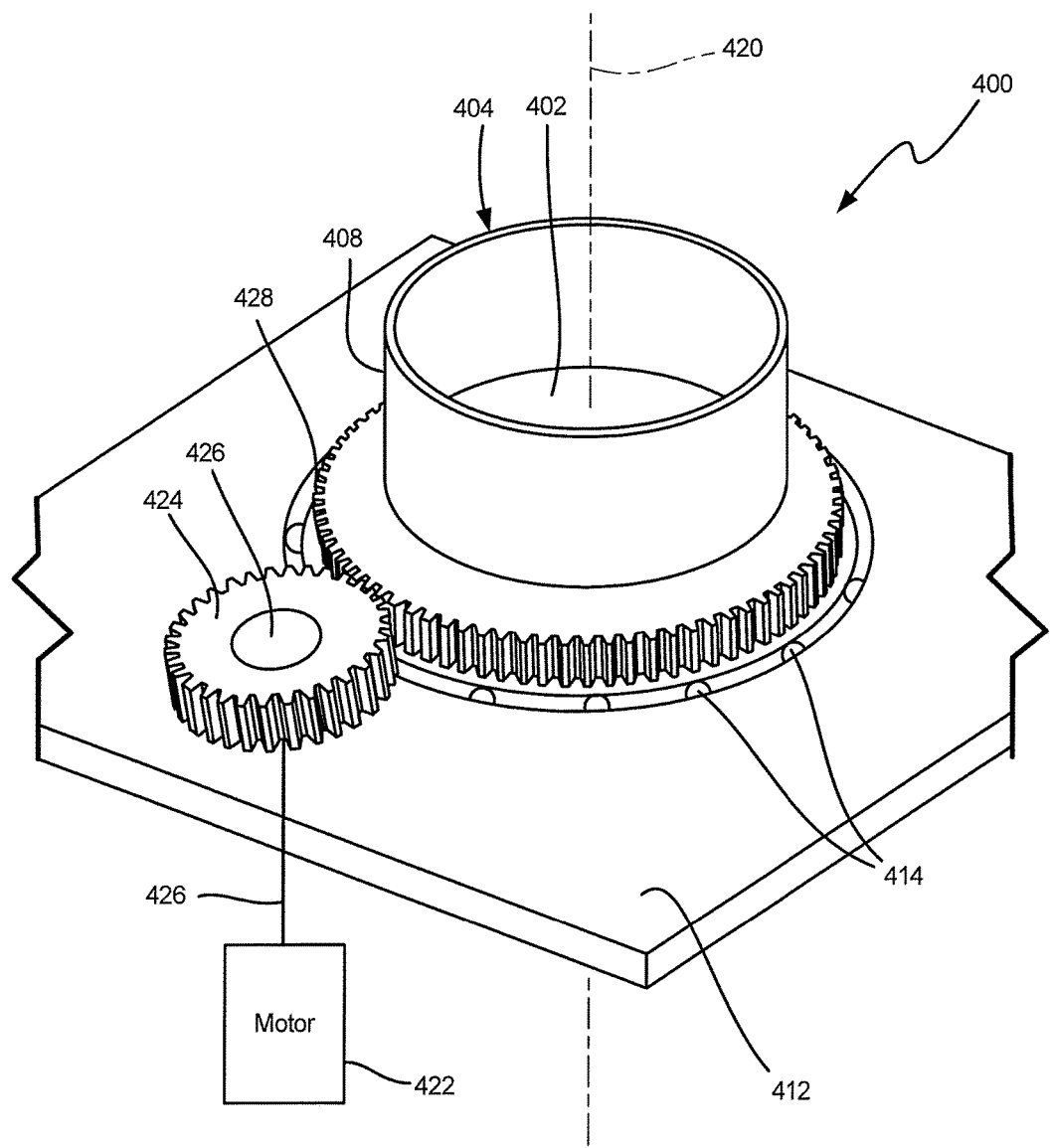
FIG. 13 is a perspective view of a CLIP system having a motor configured to engage cogs about a perimeter of a vessel to cause a rotational viscosity effect.

Referring to FIG. 13, another alternative embodiment 400 is illustrated where the vessel 404 is rotated relative to the part 111 being built by the CLIP process instead of rotating the part 111 relative to the vessel 304 in the embodiment 300 where either the plate 302 or the plate 330 can be utilized in the embodiment 400. The embodiment 400 utilizes the same CLIP process as that of the embodiment 300 and includes the same components, except that a drive motor is located in a different location.

In the embodiment 400, the vessel 404 has a continuous, substantially circular side wall 408 that extends from a bottom wall 406 that retains the plate 402. The embodiment 400 includes a rigid support 412, upon which the vessel 404 is supported proximate a perimeter thereof. The rigid support 412 includes an opening 414 such that the support 412 does not interfere with the projection of a pattern of optical stimulation through the plate 402.

Figure 14:
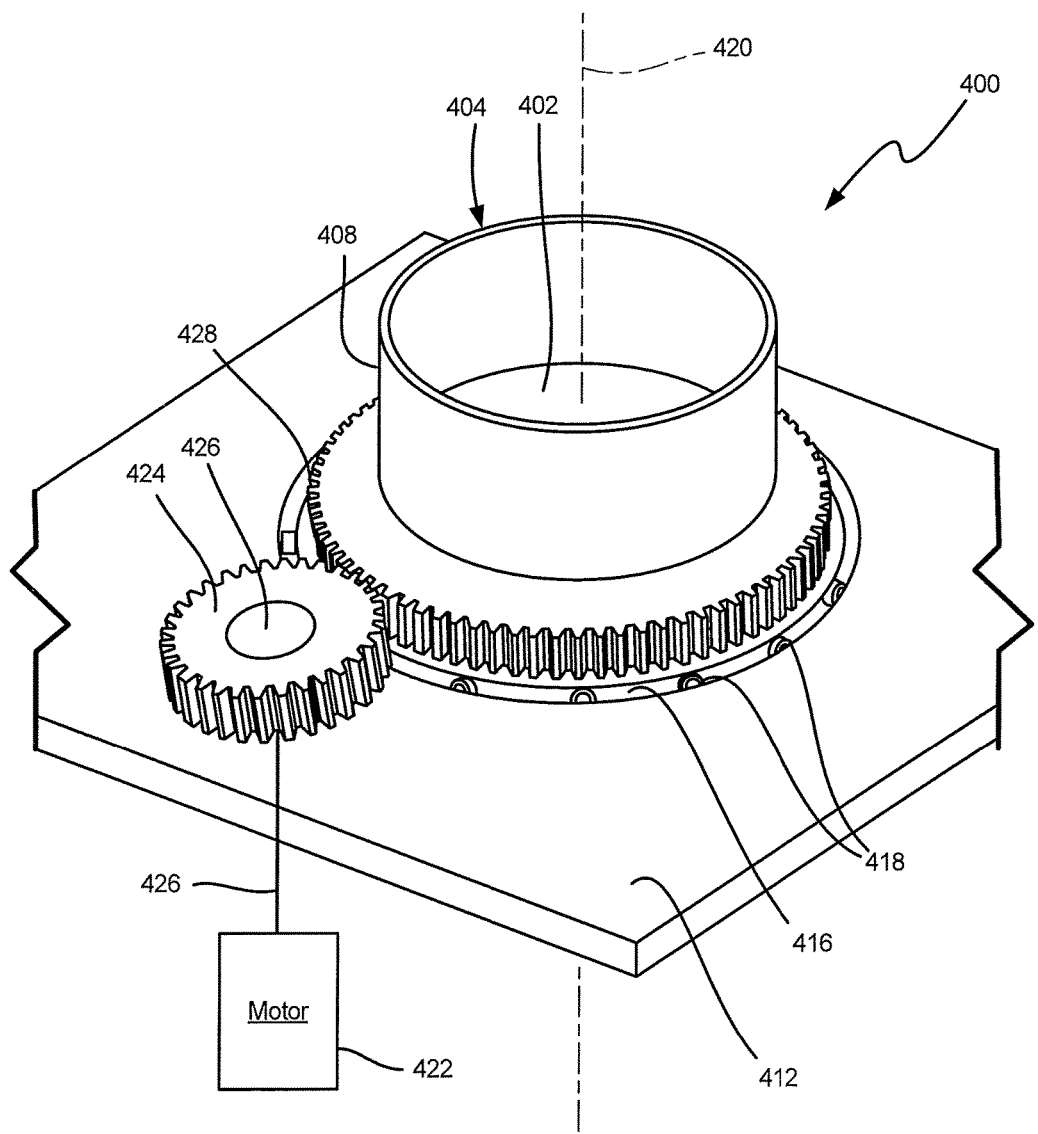
FIG. 14 is a perspective view of another CLIP system having a motor configured to engage cogs about a perimeter of the vessel to cause the rotational viscosity effect.

The support 412 can include roller bearings 414 as illustrated in FIG. 13 or a groove 416 configured to accept wheels or rollers 418 extending from the bottom wall 306 or the side wall 308 as illustrated in FIG. 14. The roller bearings 414 and/or wheels 418 within the groove 416 aid in rotating the vessel 404 relative to the support 412 by reducing the amount of drag or friction there between.

The vessel 404 is rotated about an axis of rotation 420 by an electric motor 422 that is fixedly retained to the support 412. The electric motor 422 has a drive gear 424 attached to an output shaft 426 wherein the drive gear 424 engages cogs 428 uniformly spaced around the perimeter of the vessel 404 wherein the cogs 428 are configured to mesh with the drive gear 424. As the drive gear 424 is rotated, the cogs 428 are engaged and cause the vessel 404 to rotate about the axis of rotation 420 resulting the viscosity pump effect between the plate 402 and bottom surface of the part 111, as previously described. While an electric motor is described, other drivers or actuators are within the scope of the present disclosure including, but not limited to pneumatic and hydraulic drivers or actuators. While gears are described herein, other drive mechanisms that are coupled to both the drive and the vessel are also within the scope of the present disclosure including timing pulleys and a belt, direct drive, capstan friction drive, variable speed belt drive, and worm gear drive.

In the embodiment 400, the vessel 404 remains stationary with respect to the part 111 being built until the part 111 has sufficient strength to withstand the shear forces created by the viscosity pump effect. However, because the part 111 has a substantially constant angular position because the build platen (not shown) does not rotate, a rotary position sensor is not necessary to detect the angular position of the part 111. In another embodiment, the shearing motion of the build platen with respect to the top surface commences with the start of the build, continuing at possibly varying rates during the build. There are some part geometries that might be deflected by the shearing force once the part has substantial height; for such part geometries, additional support features can be deposited during the build to buttress the part against deflection.

Figure 15:
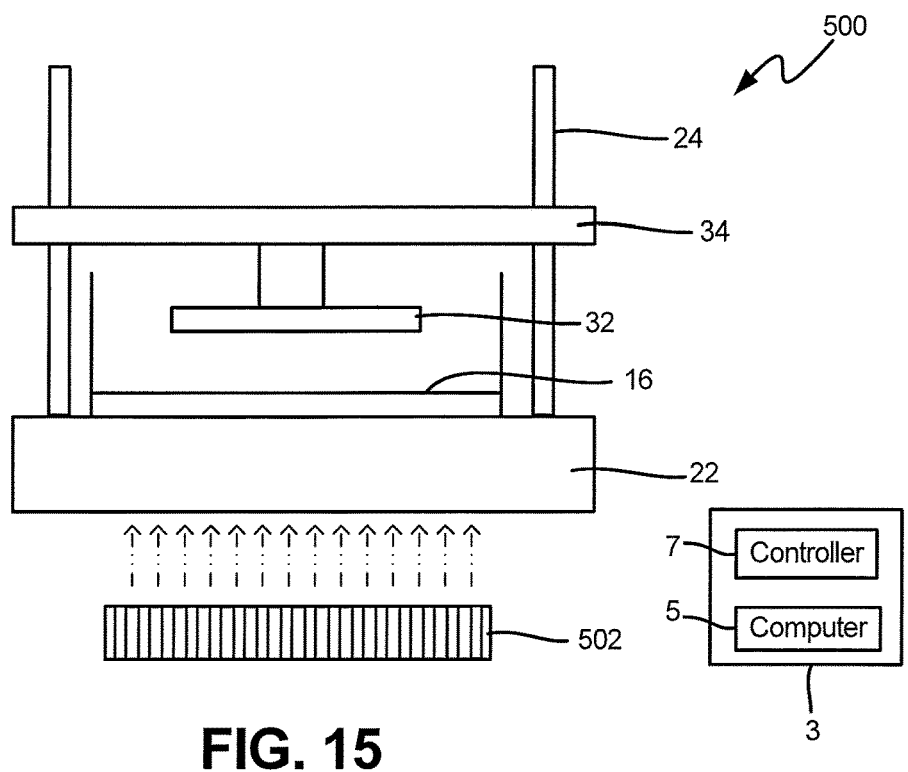
FIG. 15 is a perspective view of a CLIP system having an array of lasers as the light emitting source.

Referring to FIG. 15, another embodiment 500 is illustrated where the DLP 101 is replaced with an array of lasers 502. A controller 504 energizes the individual lasers 502 in the array to project a pattern of optical stimulation based upon a sliced three dimensional model. The CLIP process in the embodiment 500 utilizes the same equipment as that of the embodiments 100, 200, 300 or 400, except that the projector 12 is replaced with the array of lasers 502.

Figure 16:
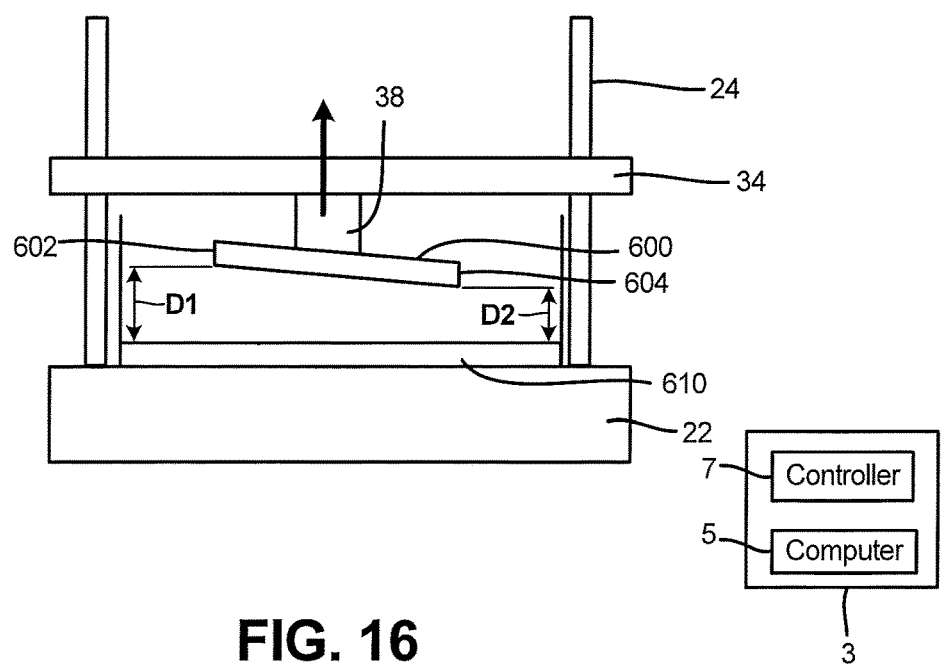
FIG. 16 is a schematic view of a part being built at an angle relative to a plate of a CLIP system.

Referring to FIG. 16, whatever embodiment 100, 200, 300, 400 or 500 is utilized, the effect of the viscosity pump can be enhanced by printing a part 600 at a slight angle such that a distance D1 from a plate 610 to a leading edge 602 of the part 600 is larger than a distance D2 from the plate 610 to a trailing edge 604 of the part 600 being built. The viscosity pump effect can be created utilizing either a rotary motion as described in embodiments 300 and 400 or with a linear motion as described in embodiments 100 and 200.

The embodiments 100, 200, 300, 400 and/or 500 can include a sensor (not shown) that measures a viscous drag of the plate surface under the part being built. The measured viscous drag by the sensor can be utilized by the computer 5 and the controller 7 to determine a thickness of the zone in which polymerization is prevent, which is commonly referred to as the dead zone. The determination of the thickness of the dead zone provides a feedback variable that can be utilized to adjust the illuminating power of the optical source and/or $V_{climb}$ of the build platen relative to the plate.

In some instances when utilizing the embodiments 100, 200, 300, 400 and/or 500, the monomer can be sprayed or jetted to form a layer on the plate prior to the layer is passed under the part. The layer is then polymerized as previously described to form a layer of the part being built. The utilization of spraying or jetting the monomer to form a layer can be beneficial to a CLIP process, especially when building parts with highly viscous monomers.

The difference between the distances D1 and D2 allows for the monomer and initiator in a pool to more easily enter the gap between the plate 610 and the bottom surface of the part 600. However, the difference in distance cannot be too great to allow the newly formed layer to adhere to the previously formed layer proximate the trailing edge 604 while polymerizing material proximate the leading edge 602 that does not bond to the part 600. A typical difference in the distances D1 and D2 is between about 5 microns and about 15 microns.

For instance, the shear force required to force an incremental length $\partial x$ of a part L long at a velocity $V_{plate}$ over a monomer layer of thickness d and viscosity $\eta$ over the plate is calculated in Equation 4.

$$\frac{\partial F}{\partial x} = \frac{L\eta V_{plate}}{d(x)} \quad \text{(Equation 4)}$$

d(x) is calculated by Equation 5.

$$d(x) = D_{co-in} + \frac{x}{W}(D_{co-out} - D_{co-in}) \quad \text{(Equation 5)}$$

Where $D_{co-in}$ is the distance from the dead zone to a leading edge of the part and $D_{co-out}$ is the distance from the dead zone to the trailing edge of the part. x is the length of the part and w is the width of the part.

The accumulated force per length of the part is found in Equation 6.

$$\frac{F}{L} = \frac{L\eta V_{plate} W}{D_{co-in} - D_{co-out}} \ln\left(\frac{D_{co-in}}{D_{coo-out}}\right) \quad \text{(Equation 7)}$$

By way of example if $D_{co-in}$ is 30 μm and $D_{co-out}$ is 20 μm and the numerator is 1 then the result is 0.987/25 μm.

The force relationship can be simplified using Equation 8 to determine an average distance $D_{co}$ that the part is from the dead zone.

$$Dco = \frac{D_{co-out} + D_{coo-in}}{2} \quad \text{(Equation 8)}$$

The force relationship is then simplified in Equation 9.

$$\frac{F}{L} = \frac{\eta V_{plate} W}{Dco} \quad \text{(Equation 9)}$$

The speed of the plate can be calculated in Equation 10 where F/(L)|0 is pound force per inch.

$$V_{plate} = \frac{F}{L}|0\frac{Dco}{\eta W} \quad \text{(Equation 10)}$$

The flow rate Q between the part and the dead zone can be calculated in Equation 11.

$$Q = V_{climb} WL \quad \text{(Equation 11)}$$

The rate at which the material is deposited on the underside of the part is flow entering the inlet to the slot defined by the distance between the last printed layer of the part and the dead zone and the flow exiting the outlet slot defined by the distance between the last printed layer of the part and the dead zone at the outlet can be calculated in Equation 12.

$$Q = LV_{plate}\frac{D_{co-out} - D_{coo-in}}{2} \quad \text{(Equation 12)}$$

Equating these two flows, the width W of the part that can be fabricated is related to the plate velocity $V_{plate}$, the climb rate $V_{climb}$ and the difference in thickness at the entrance $D_{co-in}$ and the outlet $D_{co-out}$ of the dead zone as calculated in Equation 13.

$$W = \frac{D_{co-out} - D_{coo-in}}{2}\frac{V_{plate}}{V_{climb}} \quad \text{(Equation 13)}$$

Combining the terms, the printable part width W as a function of strength and climb rate $V_{climb}$ is in Equation 14.

$$W = \frac{D_{co-in} - D_{co-out}}{2}\sqrt{\frac{1}{\eta V_{climb}}\frac{F}{L}}\bigg|0 \quad \text{(Equation 14)}$$

By way of example, when $D_{co-in}$ is 30 microns and $D_{co-out}$ is 20 microns, $\eta$ is one Poise, $V_{climb}$ is 300 mm/hr and F/(L)|0 is 10 lbf/inch, then the available part width is 2.85 inches. This example illustrates that the CLIP system that utilizes a viscosity pump effect is better suited to build larger and more dense parts than the previously disclosed CLIP systems.

Although the present disclosure has been described with reference to preferred embodiments, workers skilled in the art will recognize that changes may be made in form and detail without departing from the spirit and scope of the disclosure.

The invention claimed is:

1. A continuous liquid interface production system for building a three dimensional part, the system comprising:
a source of optical stimulation, the source configured to form a planar programmably structured image;
a vessel configured to retain a pool or a film of an optically sensitive monomer within the vessel;
a substantially optically transparent plate retained by the vessel wherein the substantially optically transparent plate is configured to be positioned below the pool or the film of optically sensitive monomer, wherein the optical stimulation is configured to be directed through optically transparent areas of the plate and into the pool or film of the optically sensitive monomer, wherein the plate comprises a plurality of spiral shaped grooves within the top surface, wherein the plate further comprises an opaque coating below the plurality of grooves wherein the opaque coating is configured to prevent transmission of light into the pool or the film through the plurality of grooves;
a source of reaction inhibitor proximate to the substantially-optically transparent plate, wherein the substantially optically transparent plate is configured to allow the reaction inhibitor to permeate through the plate and into the pool or the film such that when the system is in use a sufficient concentration of the reaction inhibitor is in the pool or the film proximate the plate to create a zone that prevents polymerization therein;
a build platen configured to be at least partially immersed into the pool or the film and above the zone at least at a beginning of a building process of the three dimensional part;

a build platen actuator configured to move the build platen in a direction substantially normal to a top surface of the plate;
a relative movement actuator configured to provide angular relative movement between the plate and the part being built in a direction substantially parallel to the top surface of the plate such that a viscosity pump effect is created that forces monomer between the part being built and the top surface of the plate wherein the spiral shaped grooves enhance the viscosity pump effect; and
a controller configured to cause the source to project the optical stimulation based upon a sliced 3D model of the part based upon sensed variables comprising at least a height of the build platen.

2. The system of claim 1 wherein the relative angular movement is a rotation in a back and forth motion.

3. The system of claim 1 wherein the plate comprises a plurality of conduits within the plate wherein the plurality of conduits is located below the plurality of grooves, wherein the plurality of conduits are configured to transport a cooling fluid.

4. The system of claim 3 wherein each of the plurality of conduits comprises:
a supply portion of the conduit having an inlet proximate a perimeter of the plate; and
a return portion of the conduit having an outlet proximate the perimeter of the plate wherein the supply portion and the return portion are in fluid communication.

5. The system of claim 1 further comprising:
an angular position sensor configured to sense an angular position of the build platen or an output shaft of an electric motor configured to rotate the build platen wherein the angular position sensor is configured to send a signal regarding the sensed angular position to the controller wherein the controller is configured to send a signal to the source of optical stimulation to cause a rotational orientation of the optical stimulation to correlate to that of the sensed rotational position of the build platen or the output shaft.

6. The system of claim 1 wherein the relative movement actuator comprises:
a driver; and
a drive mechanism engaging the driver and the vessel wherein the driver is configured to engage the drive mechanism which results in angular movement of the vessel relative to the part being built.

7. The system of claim 6 further comprising:
an angular position sensor configured to sense an angular position of the vessel wherein the angular position sensor is configured to send a signal to the controller to monitor an angular speed of the vessel relative to the part being printed.

8. The system of claim 6 wherein the plate comprises a plurality of conduits within the plate located below the plurality of grooves, wherein the plurality of conduits is configured to transport a cooling fluid.

9. The system of claim 1 wherein the source of optical stimulation comprises a digital light projector.

10. The system of claim 1 wherein the source of optical stimulation comprises an array of lasers.

11. A method of manufacturing a part with an additive manufacturing process, the method comprising:
providing a continuous liquid interface production system comprising a substantially optically transparent plate within a vessel containing a pool or film of optically sensitive monomer, wherein the plate comprises a plurality of spiral shaped grooves within the top surface, wherein the plate further comprises an opaque coating below the plurality of grooves wherein the opaque coating is configured to prevent the transmission of light into the pool or the film through the plurality of grooves, a source of optical stimulation configured to direct the optical stimulation through the optically transparent plate, a build platen configured to provide a bonding surface for the part being built, an actuator configured to raise the build platen and a controller configured to monitor a height of the build platen and to send a signal to cause the source to send optical stimulation through the plate and into the pool or the film to cause a layer of the part to be polymerized;
raising the build platen and the part being built in a direction substantially normal to a top surface of the plate while causing successive patterns of optical stimulation to be sent through the plate and into the pool or the film to build a portion of the part;
causing relative angular movement between the part and the plate in a direction substantially parallel to the top surface of the plate while raising the build platen, such that a viscosity pump effect is created between the part and the plate, wherein the spiral shaped grooves enhance the viscosity pump effect; and
causing a series of optical stimulations from the source to be emitted into the pool or the film through the plate to form additional layers of the part until the part is built.

12. The method of claim 11 wherein the relative movement between the part and the plate is rotational movement of the part relative to the plate.

13. A continuous liquid interface production system for building a three dimensional part, the system comprising:
a source of optical stimulation, the source configured to form a planar programmably structured image;
a vessel configured to retain a pool or a film of an optically sensitive monomer within the vessel;
a substantially optically transparent plate retained by the vessel wherein the substantially-optically transparent plate is configured to be positioned below the pool or the film of optically sensitive monomer, wherein the plate comprises a plurality of spaced apart and substantially parallel grooves within a top surface, wherein the grooves are at an angle between about 5 degrees and about 90 degrees relative to a linear direction of the vessel, wherein the optical stimulation is configured to be directed through optically transparent areas of the plate and into the pool or the film of the optically sensitive monomer, the grooves having an area that is small relative to a size of the plate, wherein the plate further comprises an opaque coating below the plurality of grooves wherein the opaque coating is configured to prevent the transmission of optical stimulation into the pool or the film through the plurality of grooves;
a source of reaction inhibitor proximate to the substantially optically transparent plate, wherein the substantially optically transparent plate is configured to allow the reaction inhibitor to permeate through the plate and into the pool or the film such that when the system is in use a sufficient concentration of the reaction inhibitor is in the pool or the film proximate the plate to create a zone that prevents polymerization therein;
a build platen configured to be at least partially immersed into the pool or the film and above the zone at least at a beginning of a building process of the three dimensional part;

a build platen actuator configured to move the build platen in a direction substantially normal to a top surface of the plate;
a relative movement actuator configured to provide linear relative movement between the plate and the part, wherein the relative movement actuator is configured to move the vessel in the linear direction relative to the part in an oscillating movement between the top surface of the plate and a bottom surface of the part being built in a direction substantially parallel to the top surface of the plate such that a viscosity pump effect is created that forces monomer between the part being built and the top surface of the plate, wherein the spaced apart and substantially parallel grooves within the top surface of the plate enhances the viscosity pump effect; and
a controller configured to cause the source to project the optical stimulation based upon a sliced 3D model of the part based upon sensed variables comprising at least a height of the build platen.

14. The system of claim 13 wherein the plate comprises a plurality of conduits within the plate located below the plurality of grooves, wherein the plurality of conduits are configured to transport a cooling fluid.

* * * * *